United States Patent [19]
Brown

[11] Patent Number: 5,808,368
[45] Date of Patent: Sep. 15, 1998

[54] OCEAN WAVE ENERGY CONVERSION DEVICE

[76] Inventor: Clifford H. Brown, USAID, Unit 3323, APO, AA, Wash. 34024

[21] Appl. No.: 740,991
[22] Filed: Nov. 5, 1996
[51] Int. Cl.⁶ ........................................................ F03B 13/12
[52] U.S. Cl. .................................. 290/53; 290/42; 290/43; 290/54; 60/502
[58] Field of Search .................................. 290/42, 43, 53, 290/54

[56] References Cited

U.S. PATENT DOCUMENTS

| 997,663 | 7/1911 | Ford . | |
|---|---|---|---|
| 1,292,223 | 1/1919 | Anell . | |
| 1,346,399 | 7/1920 | Crawford-Frost . | |
| 4,241,579 | 12/1980 | Borgren | 60/504 |
| 4,242,593 | 12/1980 | Quilico et al. | 290/53 |
| 4,408,455 | 10/1983 | Montgomery | 60/505 |
| 4,434,375 | 2/1984 | Taylor | 290/53 |
| 4,552,514 | 11/1985 | Hagen | 417/332 |
| 4,781,023 | 11/1988 | Gordon | 60/506 |
| 5,066,867 | 11/1991 | Shim | 290/53 |
| 5,359,229 | 10/1994 | Youngblood | 290/53 |
| 5,405,250 | 4/1995 | Vowles et al. | 417/331 |
| 5,424,582 | 6/1995 | Trepl et al. | 290/53 |

FOREIGN PATENT DOCUMENTS

| 1589377 | 5/1981 | France | F03B 13/12 |
|---|---|---|---|
| 2062113A | 5/1981 | Spain | F03B 13/12 |
| 2261706B | 6/1994 | United Kingdom | F03B 13/16 |
| 0056885 | 8/1982 | WIPO | F03B 13/12 |
| WO 95/27851 | 10/1995 | WIPO | F03B 13/16 |

OTHER PUBLICATIONS

"Ocean Energy Recovery" By R.J. Seymour, 1992, pp. 182–209.
Caddet (IEA/OECD), Renewable Energy Newsletter, Nov. 96, at p. 10 "Archimedes Wave Swing".
Funakoshi, H., Ohno, M., Takahashi, S., & Oikawa, K., "Present Situation of Wave Energy Conversion Systems", Civil Engineering in Japan, vol. 32, p. 108 (Feb. 1993).

Primary Examiner—Steven L. Stephan
Assistant Examiner—Nicholas Ponomarenko

[57] ABSTRACT

A float (3) is attached by verticle mooring lines, or cables (8), to a pivoting lever device (2) which is mounted on a submerged anchor (1). The lever device is oriented perpendicular to the shoreline, with one arm of the lever pointing shoreward and the other pointing upward. The shoreward pointing arm is almost horizontal in orientation and long enough to compensate for tidal variations. The lines (8) from the float are attached to the end of the shoreward pointing arm. Verticle pull of the float will pull upward on the shoreward pointing arm (2B) and cause it to pivot about sealed bearings (2C), which causes the upper arm of the lever device (2A) to rotate in a largely horizontal arc away from shore, thus pulling on the main drive line (7) which is attached to the end of the upward pointing arm and which leads to shore. During wave troughs the float falls naturally and the lever device is returned to its prior position by the pull exerted on the main drive line (7) by a falling weight (11) which is located in the enclosed shore structure (6), in which an energy extraction device is also located. The shore structure has a device which temporarily restrains upward motion of the float as waves pass under it, so that when released it travels upward for a greater distance and with more velocity than it would otherwise obtain. The primary advantages are: (1) eliminating the need for any pier or frame exposed to the waves and storm damage; and (2) eliminating the need for cables to pass back and forth through pulleys with each rise and fall of the waves.

7 Claims, 6 Drawing Sheets

OCEAN WAVE ENERGY CONVERSION DEVICE

BACKGROUND

1. Field of Invention

This invention is a device to convert the motion of ocean waves into useful mechanical or electrical energy, which device utilizes a method to survive high wave damage during storms.

2. Description of Prior Art

Hundreds of devices have been patented for conversion of ocean wave energy into mechanical or electrical energy. Virtually all have involved piers or frame-like structures built out over the ocean, anchored to the ocean bottom or, in some cases, floating on the ocean surface. All are thus expensive to build and vulnerable to storm damage. A large group of these devices involve floats which are connected to cables or ropes which, in turn, are connected to either to pumps or to ratchet mechanisms which turn electrical generators when the floats are either rising or falling, depending on the arrangement. For some of the earlier examples see U.S. Pat. No. 997,663 to Ford (1911); U.S. Pat. No. 1,292,223 (1918); or U.S. Pat. No. 1,346,399 to Crawford-Ford (1920).

The prior art has concentrated on ever more complex methods of more efficiently harnessing the wave action. See for example U.S. Pat. No. 5,424,582 to Trepl, II and Bashardoust (1995), U.S. Pat. No. 4,434,375 to Taylor (1984) and U.S. Pat. No. 4,232,593 to Quilico/Troya (1980). In so doing, however, the prior art has failed to sufficiently address the problems of storm survivability and ease of construction. Moreover, when the fuel is absolutely free and non-polluting, efficiency is simply not the primary issue. There is no harm in failing to capture most of the energy in a wave so long as that portion of the energy which is captured can be done so by a device which is both cheap to build and capable of surviving a storm. The primary issue is thus simplicity—the lack of which has prevented these devices from achieving widespread use.

Those devices which involve cables and pulleys near or below the water surface, connected to falling or rising floats, also have failed to sufficiently take into account the destructive and corrosive power which sand, saltwater and wave motion will have on pulleys. Continued back and forth of a cable through a pulley will necessitate frequent maintenance which, in an underwater environment, is extremely expensive.

Finally, devices of the type involving cables and pulleys will not survive storms—because there has been no simple way to disable temporarily during high wave action.

Objects and Advantages

The objects and advantages of this invention are:

(a) to avoid any pier or frame structure in or over the water.

(b) to eliminate pulleys through which cables must pass with each rise and fall of the waves;

(c) to multiply the force of the float through a pivoting lever device attached to the block anchor;

(d) to utilize the same pivoting lever device to compensate for tidal variations;

(e) to utilize a method of temporarily submerging the float during intense storm activity.

(f) to harness the float in a way which minimizes horizontal shoreward motion and maximizes verticle pull.

(g) to increase the efficiency of the shore based system by incorporating a "bounce" feature described below.

DRAWING FIGURES

Figure 1:
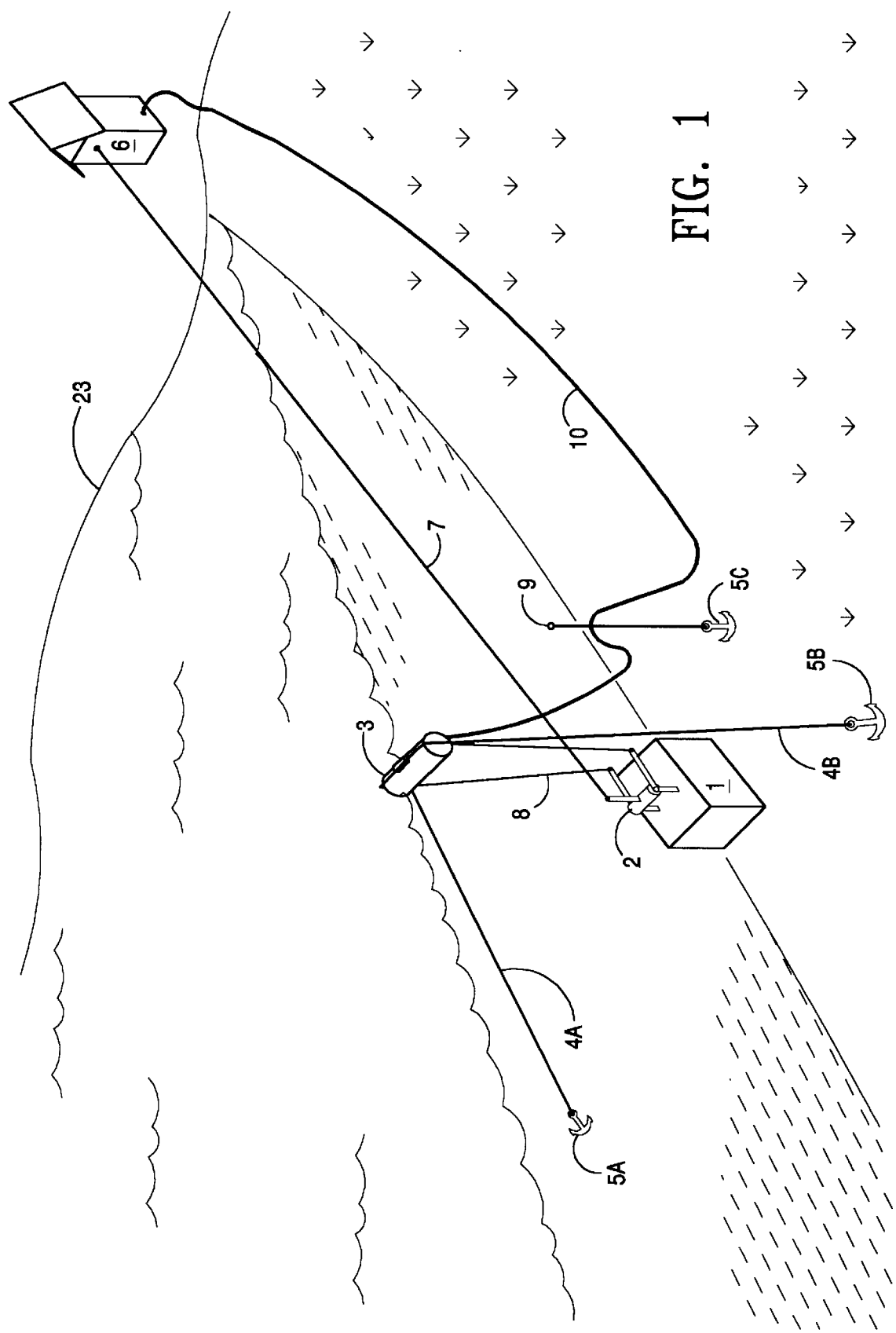
FIG. 1 is a overhead perspective view which shows the shows the float, the submerged portions of the invention, the shore line, and the enclosure on shore for the generating apparatus.

| Reference Numerals in Drawings | |
|---|---|
| 1. | primary anchor |
| 2. | lever mechanism |
| 2A. | upper arm of lever |
| 2B. | lower arms of lever |
| 2C. | pivot for lever mechanism |
| 3. | float |
| 4A. | first harness line |
| 4B. | second harness line |
| 5A. | anchor to harness line |
| 5B. | anchor to harness line |
| 5C. | anchor to air hose float |
| 6. | enclosure for generator |
| 7. | main drive cable |
| 8. | mooring lines |
| 9. | float on air hose |
| 10. | air hose |
| 11. | main drive weight |
| 12. | ratcheting spool |
| 13. | drive chain |
| 14. | gear wheel |
| 15. | generator |
| 16. | latch arm |
| 16A. | short end of latch arm |
| 16B. | long end of latch arm |
| 17. | extension of latch arm |
| 18. | sliding counter weight |
| 19. | frame for latch arm |
| 20. | stop for latch arm |
| 21. | winch |
| 22. | inflatable bag |
| 23. | shore line |
| 24. | high tide water level |
| 25. | low tide water level |
| 26A. | arc of lower arm during waves at low tide |
| 26B. | arc of uppper arm during waves at low tide |
| 27A. | arc of lower arm during waves at high tide |
| 27B. | arc of upper arm during waves at high tide |

DESCRIPTION AND OPERATION

FIGS. 1 to 6

Figure 2:
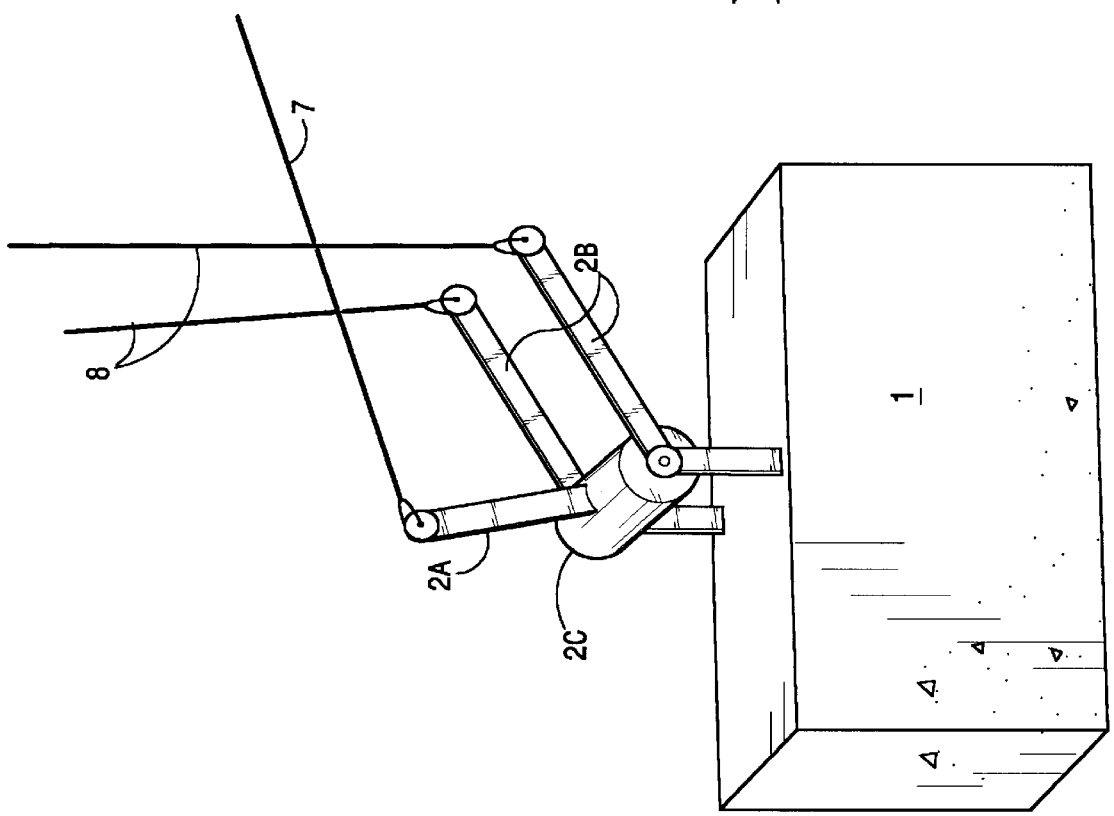
FIG. 2 is an enlarged perspective view of the submerged anchor and the pivoting arms which are attached both to the float above and to the generating appartus on shore.

A typical embodiment of this invention, except for the shore based energy extraction means, is shown in FIGS. 1 and 2. In FIG. 1, a float 3 is attached by verticle mooring lines, or cables 8, to a pivoting lever device 2 which is mounted on an anchor 1. In this embodiment the lever device is oriented perpendicular to the shore, i.e., with one arm pointing shoreward and the other pointing upward. The arms may or may not be equal in length, depending on whether leverage is desired. In this embodiment the shoreward pointing arm is longer than the other, and is almost horizontal. The lines 8 from the float are attached to the end of the shoreward pointing arm.

The float 3 is also harnessed by lines 4A and 4B which are themselves anchored further from shore to prevent excessive horizontal movement of the float toward shore with the waves. Obviously, several other lines similar to these could be used if deemed necessary to compensate for current, etc. They should all have sufficient slack to allow verticle movement by the float. Verticle pull of the float will pull upward on the shoreward pointing arm 2B of the lever device shown in FIG. 2, and cause it to pivot about sealed bearings 2C, which causes the upper arm of the lever device 2A to rotate in a largely horizontal arc away from shore, thus pulling on the main drive line 7. During wave troughs the float falls naturally and the lever device is returned to its prior position by the pull exerted on the main drive line 7 by a falling weight 11 (see FIG. 3) which is located in the enclosed shore structure 6. The lines 7 and 8 are attached to the arms of the pivoting lever device by turnbuckles which also use sealed bearings.

Figure 3:
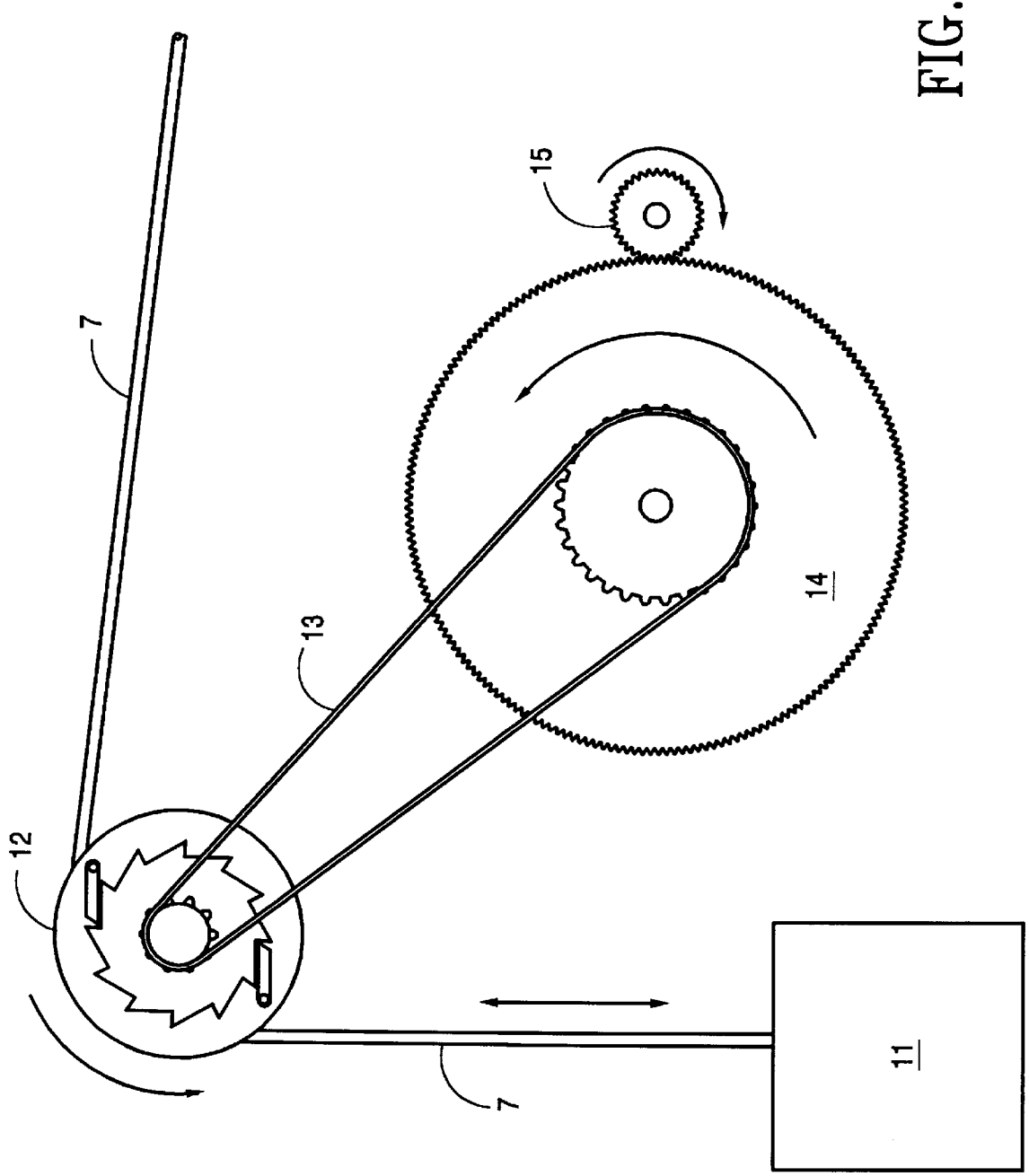
FIG. 3 is a side view of the generating apparatus.

FIG. 3 is a side view of one of many possible energy extraction means located in the shore structure 6, in which the main drive line 7—after entering the enclosed structure 6 through a hole for this purpose—is looped around a ratcheting wheel 12 and then attached to the main drive weight 11. In the embodiment this inventor used, the ratchet 12 was the rear sprocket of a bicycle wheel. A rising wave will pull the weight upwards, without engaging the drive chain, because the ratchet spins freely. But when the float 3 is falling the drive weight 11 will also fall and spin the ratcheting wheel 12 in the direction which turns the chain 13.

The chain 13 turns a gear mechanism, in this case a larger bicycle wheel 14 which itself spins a shaft on a direct current electrical generator 15. In this embodiment the resulting pulses of direct current are used to charge a battery for subsequent use. This inventor achieved approximately one watt for each pound of weight being lifted by the float. Fifty pounds thus generated about 50 watts of DC power, at a total cost of less than the best solar panels now in use. Not only is it cheaper than solar panels, it will function at night and even on cloudy days. Also, the lifting of a float by a wave is far more powerful than any comparably sized wind-powered device—since the wave itself represents the wind energy collected over many miles of sea. And in a windmill, most of the energy inevitably passes uncaptured through the blades; not so with a rising float. Obviously, the bobbing up and down on shore of a weight equal to the weight of the water displaced by the float could be used to power many other types of energy extraction devices, such as hydraulic pumps to collect pressure, spin flywheels, etc. These devices are already well known; they have not caught on because of problems of maintenance and storm damage and complexity of construction.

Figure 4:
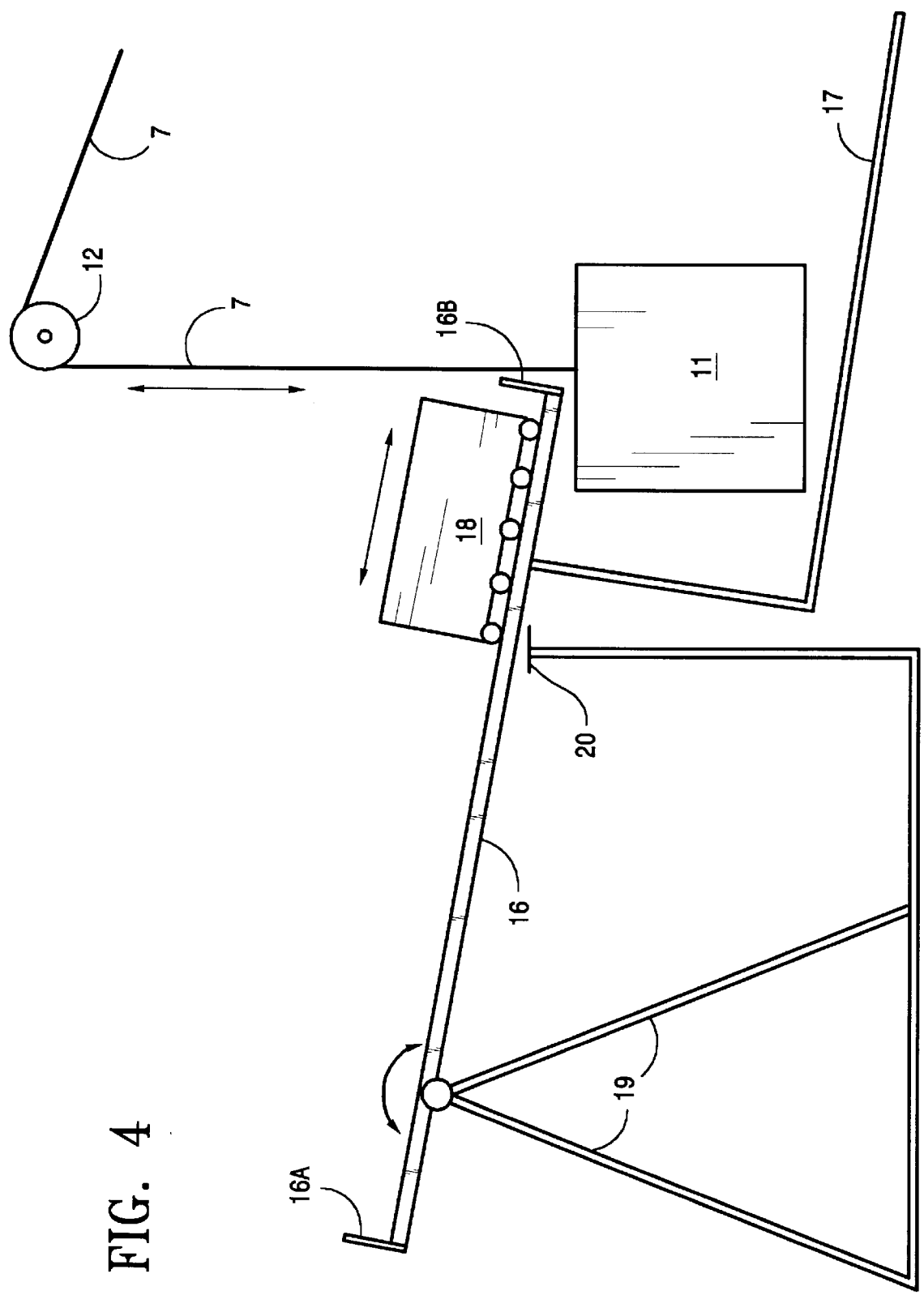
FIG. 4 is a side view of the latch mechanism.

FIG. 4 shows a latching mechanism which can be used to temporarily restrain the weight during the upward pull of the float. If the float 3 can be restrained temporarily and submerged so that the full crest of the wave rises directly over it, releasing the drive weight 11 at that point in time will cause both it and the float 3 to bounce upward higher than they otherwise would, so that the corresponding downstroke of weight 11 is of greater length. This is comparable to the phenomenon observed by releasing a large stick under water: It will shoot out of the water surface for some distance, by virtue of the momentum developed while travelling upward.

The latching mechanism works in this embodiment as follows: When the drive weight is in the position shown in FIG. 4 the long end 16B of the latch lever 16 restrains upward movement of the weight by virtue of the sliding secondary weight 18 which is mounted on rollers or a greased path, so as to slide back and forth on the latch lever 16, between the long end 16B and the short end 16A. As the force increases, the lever arm slowly pivots counter clockwise (in the view shown in FIG. 4) so that the sliding secondary weight 18 rolls or slips toward the short end 16A. At this point the drive weight 11 is freed to bounce upward higher than it otherwise would. On the downward stroke the weight 11 engages the front extension 17 of the latch arm which, by virtue of the leverage exerted is able to rotate the latch arm 16 clockwise and allow the sliding secondary weight 18 to slide back to the original position, trapping the drive weight 11 until the next upward pull.

Figure 5:
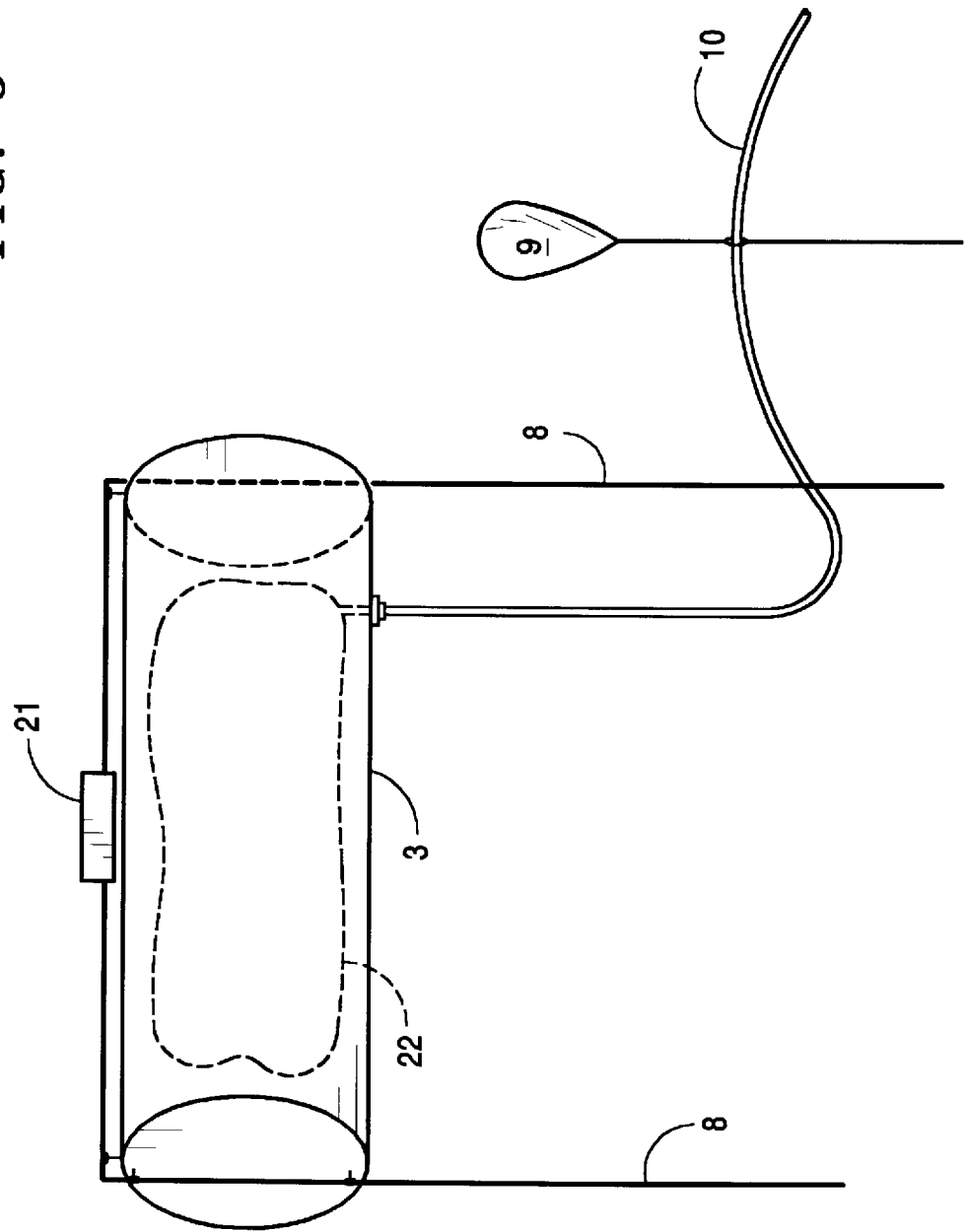
FIG. 5 is a side view of the float.

FIG. 5 shows a close up side view of the float 3. In this embodiment the float consists of a hollow cylinder, such as a 50 gallon drum, which contains an inflatable water-proof bag 22 such as a truck tire inner tube. The air hose 10 is connected permanently to the inflatable bag and led to shore 23 after being tethered to the side by the small float 9 so as to avoid becoming tangled in the mooring lines 8. The bouyancy of the float can thus be controlled from shore and, if necessary, can be reduced so as to allow the device to submerge during severe storms so as to escape surface turbulence. Any scuba diver who has entered the water during high winds will confirm that things are much calmer several feet below the surface.

FIG. 5 also shows a submersible winch device 21 which is located on the float 3. This submersible winch, of the type used on sailboats, is connected to the mooring lines 8 and used to adjust for tidal variations. It is powered by a 12 volt sealed battery and remotely controlled. During storm activity the winch can be used with or without the bag deflation method (depending on the strength of the winch and the desired depth), to "tie down" the float at a sufficient depth to avoid wave damage.

Figure 6:
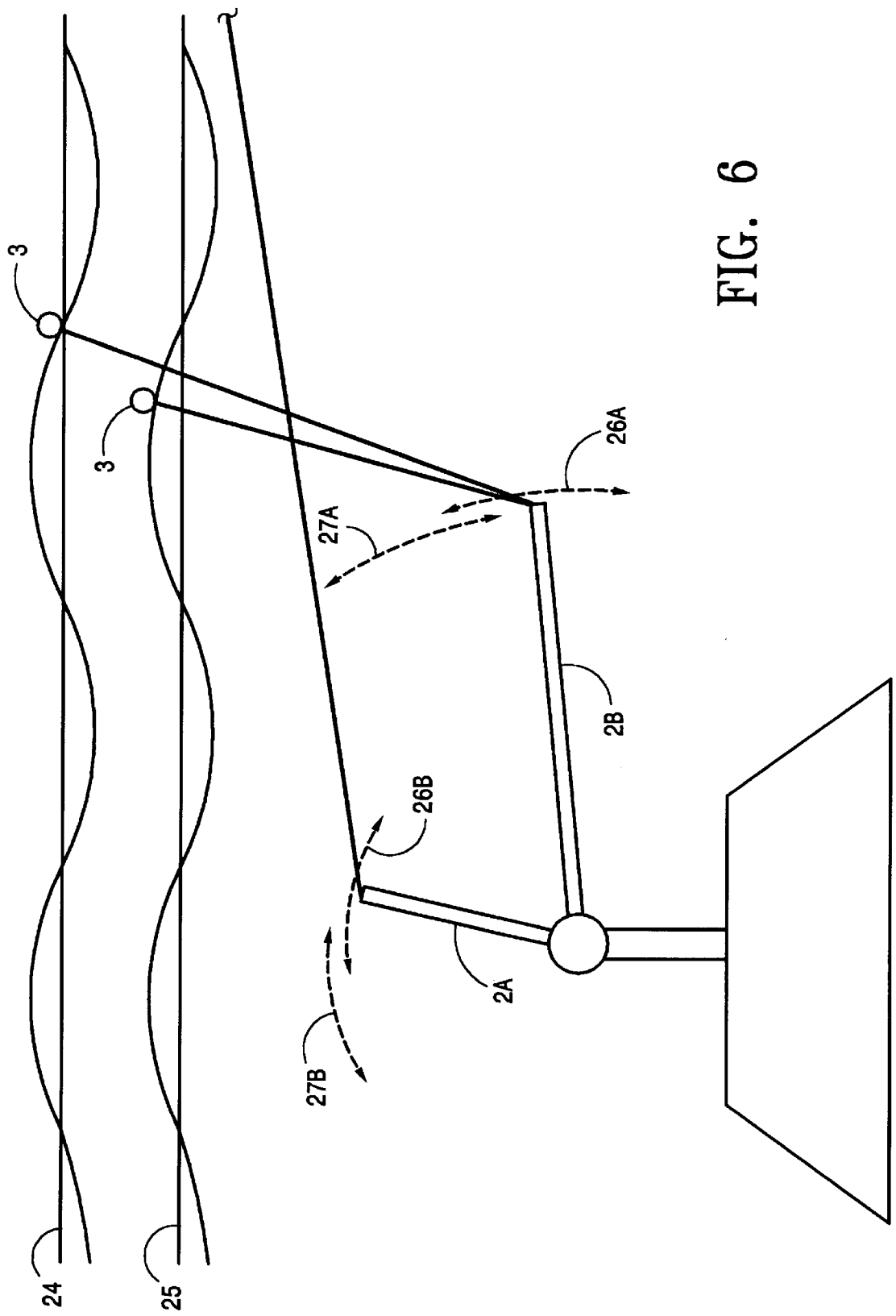
FIG. 6 is a side view of the submerged anchor and pivoting arms, showing positions at high and low tides.

An alternative method to compensate for tidal variations is shown in FIG. 6, either alone or in conjunction with the winch method shown in FIG. 5. If the shoreward pointing arm of the submerged pivoting lever device is sufficiently long, the entire device can pivot back and forth at different tide levels and still function in essentially the same manner because the arc through which the upper end of the other arm of the lever device remains generally horizontal. In FIG. 6, the water levels at high and low tides are shown by numbers 24 and 25, respectively. At low tide, waves will cause the lower and upper arms to rotate back and forth through arcs 26A and 26B, respectively. At high tide, waves will cause these same arms to rotate through arcs 27A and 27B, respectively. In either case the horizontal movement of the main drive line 7 will equal the distance between end points of the arcs of the upper arm. The weight 11 on shore will also move up and down at different levels but will rotate the ratchet mechanism 12 in the same manner regardless of the level. Such an embodiment, however, would require a different kind of latching mechanism (if any is used), since the one shown in FIG. 4 requires the weight 11 to return to approximately the same position on each downward thrust.

Conclusion

The prior art of ocean wave energy conversion has focussed on increasingly complex designs so as to more efficiently capture the energy in a given wave. In so doing, it has not achieved the most important element of all: simplicity. And it has not taken into account the high maintenance which will be needed if cables are to pass back and forth through pulleys with each rise and fall of the waves. The devices themselves also are extremely vulnerable to storm damage. This invention avoids these problems in several ways. First, the generation means is located entirely on shore, where it can be enclosed. Second, the drive cables are attached to a lever device and thus do not pass back and forth through pulleys with each rise and fall of the waves, being thus far more resistant to sand and corrosion. This invention utilizes the method of temporarily submerging the float during intense storm activity, which is necessary if the device is to survive. It also utilizes a method of temporarily restraining the float so that, when released, it will rise at a higher velocity and for a greater distance than would otherwise be the case.

The description above should not be construed as limiting the scope of the invention but as merely providing an illustration of one possible preferred embodiment of the invention. The scope of the invention should be determined by the appended claims and their legal equivalents, rather than by the example given.

I claim:

1. An apparatus and method for producing useful energy from water waves comprising:
   (a) at least one float tethered in the waves;
   (b) at least one transfer means for converting the reciprocating motion of the float into reciprocating motion to and from the shore, where said transfer means comprises a submerged anchor on which a device with at least two members joined at one end of each at a predetermined angle and pivotably mounted on said anchor at the juncture of the members, with one member connected at its other end by cable to the float and the other member being connected at its other end by a cable or a hydraulic line to a shore-based energy extraction plant; and
   (c) a shore based energy extraction means for harnessing the reciprocating motion of the transfer means to produce useful energy, whereby the motion of each float is transferred to the shore based energy extraction means without the need for cables passing through pulleys with each wave and without the need for any frame or pier-like structure exposed to the waves.

2. The apparatus as defined in claim 1 wherein the shore based energy extraction means comprises a primary weight mounted and connected by the transfer means to the submerged, pivoting members, where said primary weight will be lifted by said transfer means during periods in which the float is rising and which, by force of gravity will pull the transfer means cable back to its original position during the periods in which the float is moving down.

3. The apparatus as defined in claim 1 wherein the member which is attached to the float is of sufficient length so that such end will pass through an arc of less than approximately 120 degrees regardless of expected tide or wave levels.

4. The apparatus as defined in claim 1 wherein the cables or lines which attach the float to the transfer means are attached to winches which are used to adjust for tidal variations and to secure the float during storms.

5. The apparatus defined in claim 1 wherein the float, in addition to being tethered to the transfer means, is also tethered to anchors more distant from shore so as to minimize lateral motion.

6. In conjunction with the group of means which comprise wave-powered motors which utilize floats to produce useful energy, a method of surviving high wave damage by temporarily submerging said floats during periods of high waves comprising:
   at least one float containing an inflatable means which can be controlled so as to allow the float to submerge during periods of high waves, wherein said float is attached to lines which can be used to temporarily submerge the float.

7. In conjunction with the group of means which comprise wave-powered motors which utilize floats to produce useful energy, a method of temporarily restraining the float comprising:
   (a) a latching means to restrain said float during the initial period when said float would otherwise be lifted by the wave, and then releasing said float when the pressure on the latching mechanism reaches a predetermined level, so that the float travels upward at a greater velocity and for a greater distance than would otherwise be the case;
   (b) wherein the latching means is located in a shore based energy extraction means which is connected to the float by a transfer means and comprises:
   a primary weight which rises and falls with each wave, and
   a secondary weight which is mounted to roll or slide back and forth on a pivoting lever, the long end of which is mounted so as to restrain the primary weight until there is a predetermined lifting pressure from the primary weight, and where said pivoting lever rotates and allows the secondary weight to slide to the other end of the pivoting lever which then pivots to free the primary weight and the float to travel upward, and the long end of said pivoting lever will engage with the descending primary weight and tilt the pivoting lever back into the position in which the secondary weight will slide or roll back to restrain the primary weight until the next wave.

* * * * *